US007876351B2

(12) United States Patent
Donovan et al.

(10) Patent No.: US 7,876,351 B2
(45) Date of Patent: *Jan. 25, 2011

(54) METHODS AND SYSTEMS FOR ALERTING BY WEIGHING DATA BASED ON THE SOURCE, TIME RECEIVED, AND FREQUENCY RECEIVED

(75) Inventors: John J. Donovan, Hamilton, MA (US); Daniar Hussain, Cambridge, MA (US)

(73) Assignee: KD Secure LLC, Tallahassee, FL (US)

( * ) Notice: Subject to any disclaimer, the term of this patent is extended or adjusted under 35 U.S.C. 154(b) by 265 days.

This patent is subject to a terminal disclaimer.

(21) Appl. No.: 12/203,613

(22) Filed: Sep. 3, 2008

(65) Prior Publication Data

US 2008/0316315 A1 Dec. 25, 2008

Related U.S. Application Data (63) Continuation of application No. 11/746,043, filed on May 8, 2007, now Pat. No. 7,595,815.

(51) Int. Cl.
*H04N 7/18* (2006.01)
(52) U.S. Cl. ...................... 348/152; 348/143
(58) Field of Classification Search .......... 348/143–169
See application file for complete search history.

(56) References Cited

U.S. PATENT DOCUMENTS

| 5,164,979 | A | 11/1992 | Choi |
| 5,365,217 | A | 11/1994 | Toner |
| 5,382,943 | A | 1/1995 | Tanaka |
| 5,493,273 | A | 2/1996 | Smurlo et al. |
| 5,638,302 | A | 6/1997 | Gerber |
| 5,666,157 | A | 9/1997 | Aviv |
| 5,786,746 | A | 7/1998 | Lombardo et al. |
| 6,249,225 | B1 | 6/2001 | Wang |
| 6,424,370 | B1 * | 7/2002 | Courtney ..................... 348/143 |
| 6,437,819 | B1 | 8/2002 | Loveland |
| 6,525,663 | B2 | 2/2003 | Colmenarez et al. |
| 6,529,613 | B1 * | 3/2003 | Astle .......................... 382/103 |
| 6,542,625 | B1 * | 4/2003 | Lee et al. ..................... 382/118 |
| 6,570,496 | B2 | 5/2003 | Britton |
| 6,628,805 | B1 | 9/2003 | Hansen et al. |
| 6,700,487 | B2 | 3/2004 | Lyons et al. |
| 6,778,085 | B2 | 8/2004 | Faulkner et al. |
| 6,788,205 | B1 | 9/2004 | Mason et al. |
| 6,940,397 | B1 | 9/2005 | Le Mire |
| 6,940,998 | B2 | 9/2005 | Garoutte |
| 6,958,676 | B1 | 10/2005 | Morgan et al. |
| 6,965,313 | B1 | 11/2005 | Saylor et al. |

(Continued)

*Primary Examiner*—David Czekaj
(74) *Attorney, Agent, or Firm*—American Patent Agency; Daniar Hussain (57) ABSTRACT

Methods, systems, and apparatus for monitoring, alerting, and acting, including the following steps. Input data is received from one or more sensory devices. One or more data weights are determined for the input data based on a weight corresponding to a source of the input data, a weight corresponding to a time the input data was received, and a weight corresponding to a frequency that the input data was received. A set of rules is evaluated based on the input data and the data weights. One or more actions, including a heirarchy of one or more alerts, are activated based on the results of the evaluation of the rules.

40 Claims, 4 Drawing Sheets

U.S. PATENT DOCUMENTS

| | | |
|---|---|---|
| 6,968,294 B2 | 11/2005 | Gutta et al. |
| 6,970,102 B2 | 11/2005 | Ciolli |
| 6,972,787 B1 | 12/2005 | Allen et al. |
| 6,975,220 B1 | 12/2005 | Foodman et al. |
| 6,975,346 B2 | 12/2005 | Kumhyr |
| 7,016,518 B2 | 3/2006 | Vernon |
| 7,046,169 B2 | 5/2006 | Bucholz et al. |
| 7,382,244 B1 | 6/2008 | Donovan et al. |
| 2003/0062997 A1* | 4/2003 | Naidoo et al. ............... 340/531 |
| 2003/0214583 A1* | 11/2003 | Sadok ........................ 348/143 |

* cited by examiner

METHODS AND SYSTEMS FOR ALERTING BY WEIGHING DATA BASED ON THE SOURCE, TIME RECEIVED, AND FREQUENCY RECEIVED

REFERENCE TO RELATED APPLICATIONS

This applications is a continuation of and claims priority from U.S. Ser. No. 11/746,043, filed on May 8, 2007, issued on Sep. 29, 2009 as U.S. Pat. No. 7,595,815, the entirety of which is hereby incorporated by reference herein.

FIELD OF THE INVENTION

The present invention is generally related to security and safety systems. More specifically, this invention relates to processing of data from various systems, including video data, and generating alerts based on relative weights attributed to the data, the source of the data, as well as weights attributed to external events. The present invention may be used for various security and safety purposes, including fighting crime and ensuring safety procedures are followed.

BACKGROUND OF THE INVENTION

Governments, corporations, universities, other institutions, and individuals are increasingly concerned about security and safety. In one example involving crime, on Apr. 16, 2007, a student at Virginia Tech University killed 32 people and injured 24 others. As a result, many parents, students, and university administrators are increasingly concerned about security on college campuses.

In an example involving safety, an explosion in a Texas oil refinery killed 15 people and injured 180 others. The U.S. Chemical Safety Board determined that various factors, one of which was the absence of adequate experience in the refinery, contributed to the accident: "As the unit was being heated, the Day Supervisor, an experienced ISOM operator, left the plant at 10:47 a.m. due to a family emergency. The second Day Supervisor was devoting most of his attention to the final stages of the ARU startup; he had very little ISOM experience and, therefore, did not get involved in the ISOM startup. No experienced supervisor or ISOM technical expert was assigned to the raffinate section startup after the Day Supervisor left, although BP's safety procedures required such oversight." (See *Investigation Report: Refinery Explosion and Fire, Chemical Safety Board*, March 2007, pg. 52.) Accordingly, large and small corporations are concerned about ensuring that proper safety and security procedures are followed.

Therefore, as recognized by the present inventors, what are needed are a method, apparatus, and system for intelligent security and safety. What is needed is a method for monitoring data from various systems, including video data. What is also needed is a method for intelligent alerting of appropriate individuals based on the data.

Accordingly, it would be an advancement in the state of the art to provide an apparatus, system, and method for intelligent security and safety that receives data inputs from various systems, including video cameras, and that generates intelligent alerts based on the data inputs.

It is against this background that various embodiments of the present invention were developed.

BRIEF SUMMARY OF THE INVENTION

The present invention is a method and system for intelligent monitoring and intelligent alerting. One or more data inputs are received from one or more systems. A weight is attributed to each data input based on such factors as the input data, the source of the input data, external events, etc. One or more video inputs are received from one or more video sources. Image analysis is performed on the video data to determine one or more video parameters. The video parameters may include motion, duration of motion, face detection, etc. The video parameters are assigned one or more weights based on such factors as the magnitude of the video parameters, the reliability of the video source, etc. A series of rules are evaluated using the data inputs, the video inputs, and their respective weights. An associated action is performed for each rule that is activated. An action may be an email alert, an address on the public address system, an automatic call to the police, etc.

In one embodiment, an accumulated value is calculated from the data inputs, the video inputs, and their respective weights. A hierarchy of actions is performed based on the accumulated value and one or more threshold values.

The weights, the rules, and the actions are configurable by a system administrator. The system administrator may customize the types of actions, their hierarchy, under what conditions actions are escalated, etc. In one embodiment, forced alerts are used, in which a person at a given level must respond to an alert, and if the person does not respond, the alert is automatically escalated to a higher level.

An authorized user, such as a security officer, can view the status of the alerts at any time using a terminal connected to a network. The security officer has an interface which shows meters representing an accumulation of all data inputs and video inputs. The meters show the relationship of the accumulated value and the thresholds. The meters may be sliding bars, circular gauges, or any alternative design. For example, the meter may go from grey to yellow when motion is detected in a given area of a certain video source for a given period of time. The meter may then turn red when in addition to the motion being detected, a certain individual swipes through a given entrance and the time is after a certain hour. This may be applied to a situation in which an executive enters his or her office building late at night, and there is motion detected for more than ten minutes behind his desk.

Other features, utilities and advantages of the various embodiments of the present invention will be apparent from the following more particular description of embodiments of the invention as illustrated in the accompanying drawings.

DETAILED DESCRIPTION OF THE INVENTION

The present invention provides intelligent security and safety monitoring. The present invention may be implemented as a modular system that can utilize several core components that may be integrated together: video detection components, input components, action components, and service components. A rules engine codifies and evaluates various rules, such as "issue an alert to person A when motion is detected in location B for time period C." The video detection components are used to extract relevant video parameters from the video sources; the video parameters are input into the rules engine. The input components may be used to receive inputs from other systems, for example sensory devices, such as temperature probes. The action components represent various actions that may be taken under certain conditions, and may be activated by the rules engine. Finally, the service components provide interfaces for services performed by human beings ("Artificial artificial intelligence"), for example remote monitoring by off-shore security guards ("Mechanical Turks").

The present invention may be implemented using any number of detection, input, action, and service components. Some illustrative components are presented here, but the present invention is not limited to this list of components. An advantage of the present invention is the open architecture, in which new components may be added as they are developed.

Figure 1:
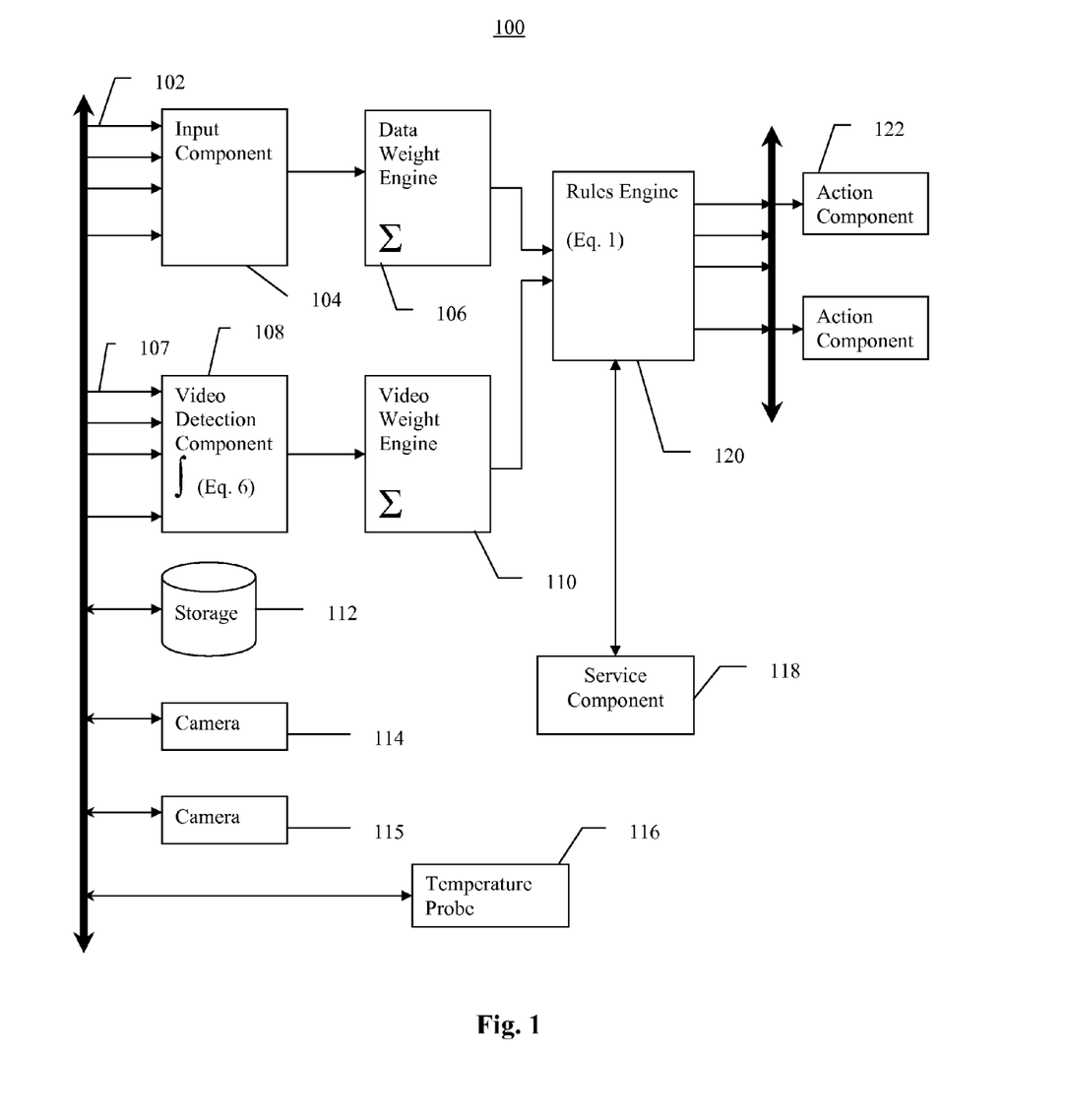
FIG. 1 illustrates a system architecture of one embodiment of the present invention.

FIG. 1 shows system architecture 100 of one embodiment of the present invention. One or more data inputs 102 are received via one or more input components 104 (only one input component is illustrated for clarity). The data inputs could be data from police reports, anonymous tips, sensory devices, etc. In one embodiment, data inputs could come from a personnel database in storage 112 and from temperature probe 116. The input components, such as input component 104, provide interfaces between the system 100 and various input devices. The data inputs 102 are assigned a weight by data weight engine 106. The weights may be a function of the input data, the source of the input data (such as its reliability), external events (such as the National Terror alerts in the United States), or any other information. (Only one input data is shown being processed by data weight engine 106 for clarity.)

One or more video inputs 107 are received and processed by one or more detection components 108 (only one video detection component is illustrated for clarity). The video inputs could be historical, archived video data, such as video from storage 112, or could be video data from live video cameras, such as camera 114 or camera 115. The detection components, such as detection component 108, determine one or more video parameters from the video inputs 107. For example, detection component 108 may detect whether or not there is a person in a particular region of video input 107. The one or more video parameters that are determined by the detection component 108 are assigned a weight by video weight engine 110. The weights may be a function of the video data, the video source (such as its reliability), external events (such as the National Terror alerts in the United States), or any other information. (Only one video parameter is shown being processed by video weight engine 110 for clarity.)

Cameras 114 and 115 may be digital IP cameras, digital PC cameras, web-cams, analog cameras, cameras attached to camera servers, etc. Any camera device is within the scope of the present invention, as long as the camera device can capture video. Some cameras may have an integrated microphone; alternatively, a separate microphone may be used to capture audio data along with video data. As used herein, the terms "video," "video data," "video source," etc. are meant to include video without audio, as well as video with interlaced audio (audiovisual information). Of course, it is to be understood that the present invention may also be implemented using audio data without accompanying video data by replacing cameras with microphones.

The weighted input data and the weighted video data (outputs from the data weight engine 106 and the video weight engine 110) are processed by rules engine 120. Rules engine 120 evaluates a set of rules based on the weighted input data and the weighted video data. The rules engine 120 activates one or more actions via one or more action components 122. For example, the rules engine 120 may contain a rule stating: "Issue email alert to Executive A (Action Component 1) if Executive A swipes into office building (Data Input Component 1) and within the last twenty minutes there was motion for more than five minutes in the region behind his desk on the camera in his office (Detection Component 1)." If the preconditions of the rule are satisfied, the action is performed. As discussed previously, the preconditions may be weighted based on the data, the source of the data, external events, and other information. For example, the executive swiping into a building would be given a higher weight than a tip saying that the executive has entered the building. A security guard logging into a system that the executive has entered the building may receive an even higher weight.

In FIG. 1, data may also come from a service component 118. Service components, such as service component 118, are interfaces to human operators ("Artificial artificial intelligence"). For example, a service component may provide an interface for human operators to monitor a given area for suspicious activity, and to send a signal to the rules engine 120 that suspicious activity is going on in a given area. The rules engine 120 will activate an action if a corresponding rule is activated. Alternatively, the human operator may force an action to be performed by directly activating an action component, such as action component 122.

Equations 1 to 4 show possible rules that may be evaluated by rules engine 120. For example, as shown in Eq. 1, action component $a_1$ will be activated if the expression on the left-hand side is greater than a predetermined threshold $\tau_1$. In Eqs. 1-4, "a" stands for action component, "f, g, and h" are predetermined functions, "w" stands for weight, "x" stands for the input data, and "v" stands for video data. Eqs. 1-4 could represent a hierarchy of actions that would be activated for different threshold scenarios. Alternatively, Eqs. 1-4 could represent several rules being evaluated in parallel. Eqs. 1-4 are illustrative of only one embodiment of the present invention, and the present invention may be implemented using other equations, other expressions, or even by using heuristic rules rather than equations.

$$a_1 = f_i(\Sigma_{i=1}^{i=n} w_i \cdot x_i) + g_j(\Sigma_{i=1}^{i=m} w_i \cdot v_i) + h_j(\int_{t=1}^{t=t_n} w(v) \cdot v(t) \, dt) \geq \tau_1 \quad (1)$$

$$a_2 = f_i(\Sigma_{i=1}^{i=n} w_i \cdot x_i) + g_j(\Sigma_{i=1}^{i=m} w_i \cdot v_i) + h_j(\int_{t=1}^{t=t_n} w(v) \cdot v(t) \, dt) \geq \tau_2 \quad (2)$$

$$\ldots \quad (3)$$

$$a_j = f_j(\Sigma_{i=1}^{i=n} w_i \cdot x_i) + g_j(\Sigma_{i=1}^{i=m} w_i \cdot v_i) + h_j(\int_{t=1}^{t=t_n} w(v) \cdot (t) \, dt) \geq \tau_j \quad (4)$$

Equation 5 shows an example of a calculation of determining a weight that may be performed by data weight engine 106 or video weight engine 110. The weight "w" may be based on several factors, including the source of the data "s" (for example, the reliability of the source), the time that the data was received "t" (for example, older data would be assigned a lower weight), and the frequency that the data was received "f" (for example, the same data received multiple times would be assigned a higher weight). Other weighting factors may also be used, and the weighing factors described here are illustrative only and are not intended to limit the scope of the invention.

$$w_i = s_i \cdot t_i \cdot \ldots f_i \quad (5)$$

Equation 6 shows an example of a calculation that may be performed by detection component 108 to determine a video parameter "$v_i$" from the video data "v(t)". Eq. 6 shows a video stream "v(t)" weighted by a weighting function "w(v)" and integrated over time from time t=1 to t=$t_n$. The video parameter "$v_i$" may be obtained as a function "$f_i$" of the integral. For example, a detection component for counting the number of people that enter a region over a period of time may perform face detection in a given frame, count the number of faces detected, and then integrate over several frames to obtain a final count.

$$v_i = f_i(\int_{t=1}^{t=t_n} w(v) \cdot v(t) \cdot dt) \quad (6)$$

In one embodiment, the function "$f_i$" of Eq. 6 may be a composition of several functions, as shown in Equation 7. For example, a detection component may count the number of people wearing a safety helmet that enter a given area by composing a safety helmet detection function with a people counting function.

$$f_i = f_1 \circ f_2 \circ \ldots \circ f_n \quad (7)$$

In one embodiment, the new, or future, weights "$w_j$" may be based on the past weights "$w_i$" and external events "$e_i$". Examples of external events could be "Amber Alerts" for missing children, "National Terror Alerts" for in the United States, etc. Eq. 8 shows an example of a calculation for determining new, or future, weights "$w_j$" by composing a matrix of past weights "$w_i$" with external events "$e_i$".

$$\begin{bmatrix} w_1 \\ w_2 \\ \ldots \\ w_j \end{bmatrix} = [e_1, e_2, \ldots, e_n] \cdot \begin{bmatrix} w_1 \\ w_2 \\ \ldots \\ w_i \end{bmatrix} \quad (8)$$

Figure 2:
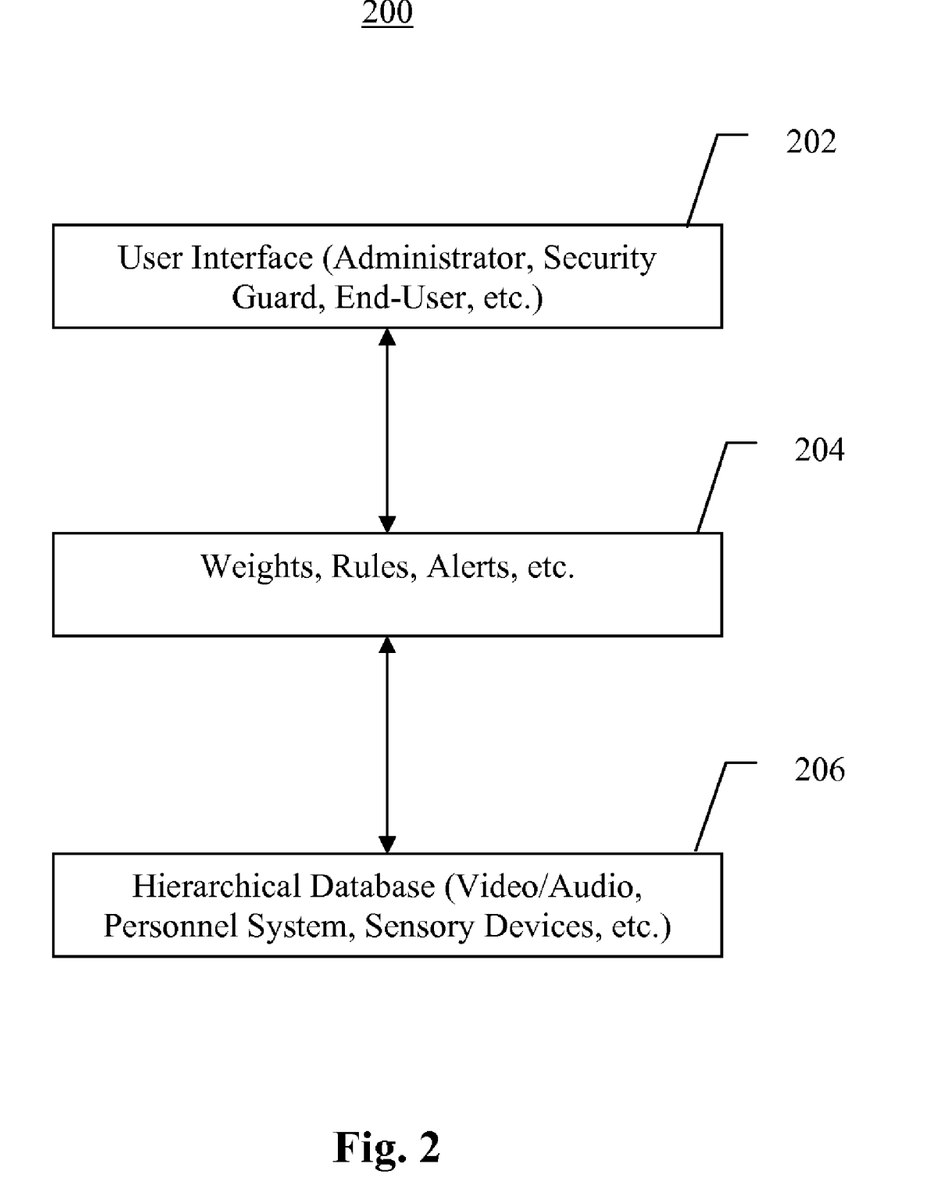
FIG. 2 illustrates a software architecture of one embodiment of the present invention.

FIG. 2 shows a software architecture 200 of one embodiment of the present invention. A presentation layer 202 provides the front-end interface to users of the system 100 of FIG. 1. Several user interfaces are provided. For example, a user interface is provided for an administrator, who can modify various system parameters, such as the data input components, the detection components, the data and video weights, the rules, as well as the action components. Another user interface is provided for an officer, such as a security guard, to monitor the activity of the system 100. For example, a user interface for the security officer would allow the officer to monitor alerts system-wide, turn on and off appropriate cameras, and notify authorities. An interface is also provided for an end-user, such as an executive. The interface for the end-user allows, for example, the end-user to monitor those alerts relevant to him or her, as well as to view those cameras and video sources he or she has permission to view. Various user interfaces may be created for various users of the present invention, and the present invention is not limited to any particular user interface shown or described here.

A middle layer 204 provides the middleware logic for the system 100. The middle layer 204 includes the weight engines 106, 110 as well as the rule engine 120 of FIG. 1. The middle layer interfaces with the user interface 202 and evaluates the logic of Equations 1-8.

A database layer 206 is provided for storing the input data and the video data. In one embodiment, the database layer 206 may be implemented using a hierarchical storage architecture, in which older data, or less frequently used data, is migrated to slower and cheaper storage media. The database layer 206 provides the input data and the video data to the middle layer 204, which in turn processes the data for display by the presentation layer 202.

Figure 3:
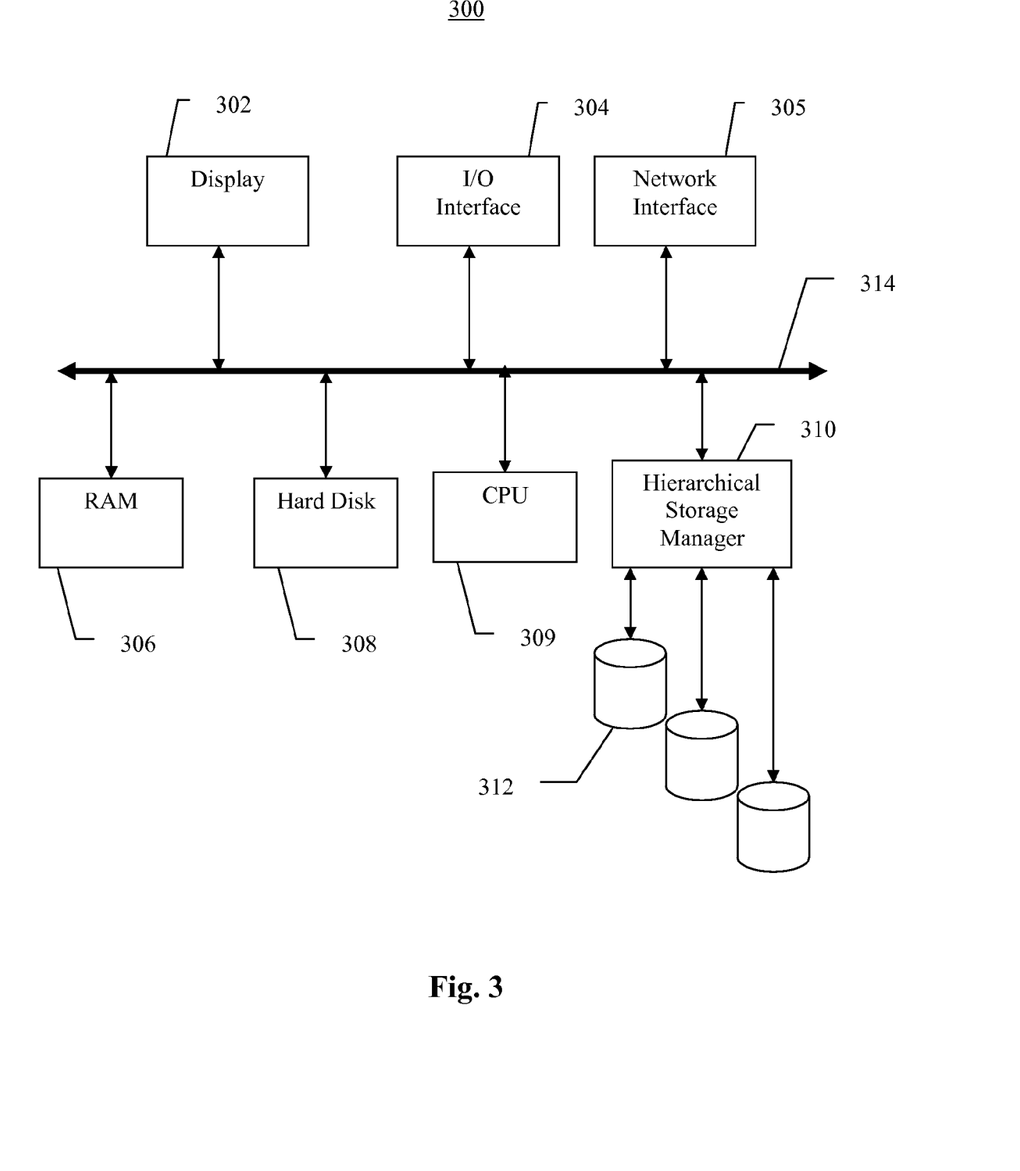
FIG. 3 illustrates a hardware architecture of one embodiment of the present invention.

FIG. 3 shows a hardware architecture 300 of one embodiment of the present invention. The software architecture 200 may be implemented using any hardware architecture, of which FIG. 3 is illustrative. A bus 314 connects the various hardware subsystems. A display 302 is used to present the output of the presentation layer 202 of FIG. 2. An I/O interface 304 provides an interface to input devices, such as keyboard and mouse (not shown). A network interface 305 provides connectivity to a network, such as an Ethernet network, a Local Area Network (LAN), a Wide Area Network (WAN), an IP network, the Internet, etc. RAM 306 provides working memory while executing a process according to system architecture 100 of FIG. 1. Hard disk 308 provides the program code for execution of a process according to system architecture 100 of FIG. 1. CPU 309 executes program code stored on hard disk 308 or RAM 306, and controls the other system components. Hierarchical storage manager 310 provides an interface to one or more storage modules 312 on which video data is stored. It is to be understood that this is only an illustrative hardware architecture on which the present invention may be implemented, and the present invention is not limited to the particular hardware shown or described here. It is also understood that numerous hardware components have been omitted for clarity, and that various hardware components may be added without departing from the spirit and scope of the present invention.

Figure 4:
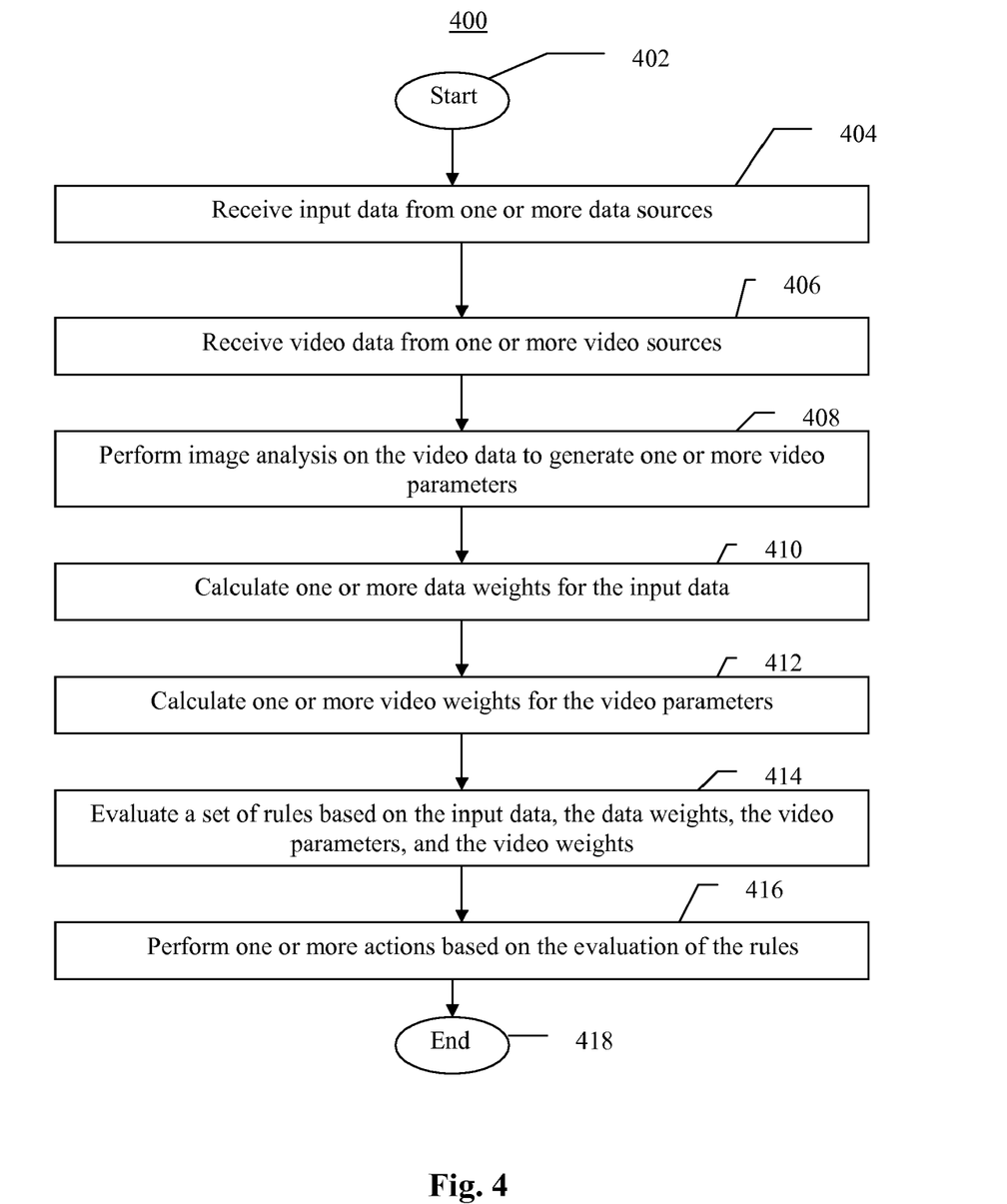
FIG. 4 illustrates a flowchart of a process according to one embodiment of the present invention.

FIG. 4 illustrates a process 400 according to one embodiment of the present invention. Process 400 may be stored in hard disk 308 and RAM 306, and may be executed on CPU 309 of FIG. 3. The process starts at step 402. Input data from one or more data sources is received, as shown in step 404. Video data from one or more video sources is received, as shown in step 406. Image analysis is performed on the video data to generate one or more video parameters, as shown in step 408. One or more data weights are calculated for the input data, as shown in step 410. One or more video weights are calculated for the video parameters, as shown in step 412. A set of rules is evaluated using the input data, the data weights, the video parameters, and the video weights, as shown in step 414. One or more actions are performed based on the evaluation of the rules, as shown in step 416. Process 400 ends in step 418.

According to the present invention, various detection components may be used to determine one or more video parameters from the video inputs. These detection components may be configured to record meta-data along an occurrence of each event. For example, if a person is detected in an area by a face detection component, meta-data may be stored along with each occurrence of that person in the video. Some illustrative detection components are listed below. However, the present invention is not limited to these detection components, and various detection components may be used to determine one or more video parameters, and are all within the scope of the present invention.

1. Detect presence of intruder in designated area
2. Detect presence of intruder in designated area during designated time
3. Detect whether it is a person in designated area (excluding pets, wind, etc.)
4. Detect number of people in designated area
5. Detect if more people entered a designated area than left the designate area
6. Detect voice (sound) volume
7. Recognize certain sound patterns, such as gunshots or shouts
8. Detect certain key words
9. Detect speed of motion of an object 10. Detect size of object
11. Detect area of motion
12. Detect acceleration
13. Detect if person is too short in designated area
14. Detect if person is too long in designated area
15. Detect a face
16. Recognize a certain face
17. Detect object left in a given area for a certain period of time
18. Count number of vehicles
19. Detect if vehicle crossed lane
20. Detect if vehicles is driving the wrong way in a lane
21. Determine type of vehicle
22. Detect license plate of vehicle
23. Detect percent of lane occupied
24. Detect speed of vehicle Additionally, various sensory devices may be integrated into system 100 of FIG. 1 by adding an input component for receiving and processing the input from the sensory device. Some illustrative input components are listed below. However, the present invention is not limited to these input components, and various other input components associated with various other sensory and other devices are within the scope of the present invention.

1. Measure temperature
2. Measure pressure
3. Measure height
4. Measure speed
5. Measure revolutions per minute
6. Measure blood pressure
7. Measure heart rate
8. Measure RFID signal
9. Measure chlorine level
10. Measure radon level
11. Measure dust particle level
12. Measure pollution level
13. Measure $CO_2$ emission level
14. Measure bacteria level in water
15. Measure water meter
16. Measure electrical meter As described above, various action components may be used to perform one or more actions in response to a rule being activated. The rules engine may activate one or more action components under certain conditions defined by the rules. Some illustrative action components are listed below. However, the present invention is not limited to these particular action components, and other action components are within the scope of the present invention.

1. Send email alert to designated person
2. Send SMS alert to designed phone number
3. Send message to designated blackberry
4. Send alert to public address system
5. Send message or picture to police
6. Send alert email to mass mailing list
7. Send text message (SMS) to mass list
8. Send alert to PC or PocketPC
9. Call designated phone
10. Turn lights on or off in designated area
11. Turn thermostat up or down
12. Turn camera on or off
13. Issue a forced alerts (with automatic escalation if no response)
14. Follow a person using Pan-Zoom-Tilt (PTZ) camera
15. Follow a person from camera to camera According to the present invention, service components may be used to integrate human intelligence into system 100. For example, a service component may provide a user interface for remote security guards ("Mechanical Turks") who may monitor the video inputs. Some illustrative examples of what the security guards could monitor for and detect is listed below. Some events, such as "suspicious behavior," which may be hard for a computer to detect, may be detected by a human operator ("Artificial artificial intelligence"). The human operators may also add meta-data for each occurrence of an event. For example, a security guard may add meta-data to each portion of a video where he or she noticed suspicious activity. The present invention is not limited to the examples described here, and is intended to cover all such service components which may be added to detect various events using a human operator.

1. Detect people going into building but not coming out
2. Detect people carrying packages in and not carrying out
3. Detect people carrying packages out but not carrying in
4. Detect people wearing different clothes
5. Detect people acting suspiciously
6. Detect people carrying guns
7. Detect people tampering with locks
8. Detect people being mugged
9. Detect a shooting
10. Detect people being bullied The components listed above may be reused and combined to create advanced applications. Many advanced applications may be assembled by using various combinations and sub-combinations of components. The following discussion illustrates several advanced applications that may be created using the above components: a university security application, and a workflow safety monitoring application.

A security application may be created for a university, college, or school using appropriate components selected from the above. For example, cameras and gunshot detection devices may be installed around a campus. The gunshot detection devices are interfaced to the system 100 via an appropriate gunshot input component. The cameras are monitored by appropriate detection components, for example, a face detection component may be utilized in order to detect faces in a video image. Various action components may be installed, including an action component to alert the campus police and an action component to send a text message via SMS to all students on campus. The university's student and personnel system may also be interfaced to the system 100 via an appropriate input component. The rules engine would be configured by a system administrator at the university. For example, a sample rule may say, "If only one card swipe is registered in the student system, while two or more people are detected passing a certain threshold on a video camera monitoring a turnstile (tailgating), then issue an audible alert to the security guard." Another rule may say "If a sensory device has detected a gunshot, then issue an alert to the campus police as well as a text message via SMS to all students on campus."

A service component may be added, which may provide an interface for a security guard sitting in a central location on campus to monitor all alerts coming into the system. The service component may include a user interface for the security guard to view selected cameras, notify the police, or issue alerts to all students.

One example of an illustrative scenario is described here. However, the present invention is not limited to this particular scenario. Suppose a student is detected tailgating behind another student to gain entrance into a dormitory, by using the face detection and student system input components described above. First, an audible alert would be automatically issued to anybody in the vicinity of the dormitory entrance. Then, suppose a gunshot is detected by one of the gunshot devices, and the data enters the system via a gunshot input component. These two events are assigned weights by the weight engines. The rules engine would evaluate the second rule, and automatically notify the police and send a mass text message to all students on campus. Such a system configuration of the present invention could have prevented the second set of shootings at Virginia Tech.

In one embodiment, another action component may be activated, for example a "Follow Person" component. Such a component would track the person who was detected as tailgating through the entrance and follow that person through multiple cameras around campus. The person may be followed either in real time, switching from camera to camera as the person moves, or by retracing the steps the person has already taken. Further, the person's steps on previous visits may also be retrieved using a face recognition component.

In another embodiment, an input component may provide an interface to the police system, for example, a database of arrest and reports of criminal activities. The data inputs and video inputs are weighted according to their sources. For example, data from police records are weighted highly, while data from anonymous tips are weighted lower. The weighted values are input into the rules engine which determines the alerts or other actions to take based on the rules.

Another application may be created for safety, auditing, and security of a facility using the above components. By integrating with legacy systems using the input components and receiving inputs from video cameras, the safety system may enforce various workflow, process flow, and/or safety rules and regulations. For example, if a safety alert is issued, then certain cameras may be turned on to monitor each of various steps necessary to correct the safety problem by monitoring the number of people at each step of the process, the length of time each person stays at each step of the process, etc.

One example of an illustrative scenario is described here. However, the present invention is not limited to this particular scenario. As stated previously, an explosion at an oil refinery in Texas was contributed by an experienced manager leaving the premises. This disaster would have been prevented by enforcing workflow and process flow constraints by using the principles and components of the present invention. For example, by using a face counting component to count the number of faces in a room, and a rule to issue an alert if there is not a face at each of the required workstations. An input component would be used to interface to legacy systems, such as personnel systems, and to determine average experience levels of personnel in each section of the refinery. Various action components may be used to issue intelligent alerts to various personnel depending on customizable conditions, such as severity, time, and response necessary for the alert. Various workflow and process flow constraints may be enforced by utilizing the input components and video detection components. The workflow may be codified in a set of rules in the rules engine, and which may be setup by a system administrator.

For example, suppose a first worker with 10 years of experience entered the refinery, his face was detected by a camera on the entrance doorway into the refinery, his face was recognized against a database of employees, his name was retrieved, his experience level was retrieved from the personnel system, and the rules engine determined that an acceptable average experience level was present in the refinery (10 years). Suppose another worker with only 2 years of experience entered the refinery, his face was detected by the camera on the entrance doorway into the refinery, his face was recognized against a database of employees, his name was retrieved, his experience level was retrieved from the personnel system, and the rules engine determined that an acceptable average experience level was present in the refinery (6 years average). Now suppose the first worker with 10 years experience leaves the refinery, his face is detected by a camera on the exit doorway, his face is recognized against a database of employees, his name is retrieved, his experience level is retrieved from the personnel system, and the rules engine determines that the average experience level has dropped below a predetermined threshold (e.g., 6 years). The rules engine then activates an appropriate action, such as issuing an alert, corresponding to the rule that was activated. (Suppose in this scenario, the rule was codified by the system administrator to issue an alert if the average experience level in the refinery drops below 6 years.) Such a system configuration of the present invention could have prevented the explosion in the Texas oil refinery.

In one embodiment, various sensory devices may monitor the refinery. If a sensory device detects something irregular, the rules engine issues an audible alert and activates certain cameras to ensure that a proper response is taken. For example, if the pressure in the refinery goes up, then cameras corresponding to those valves that need to be adjusted are turned on. If no face is detected in those cameras for the next ten minutes, then the rules engine may escalate the alert to appropriate management. Such a system, constructed according to the present invention from the components described here, could have prevented the explosion in the Texas refinery.

Other embodiments of the present invention may be used for auditing, compliance, and banking fraud detection. For example, the components of the present invention may be used to create an application for banking fraud detection, including banking verification, and fraud/theft prevention. At an ATM, a signature may be captured via a signature input component. A face may be captured via a camera installed on the ATM machine. A face recognition component may be used to determine whether the face is associated with the signature, and/or the bank card that was inserted into the ATM machine. Various alerts may be issued based on the face recognized, the time of day, the length of time the person is at the ATM, the amount of money that is being withdrawn, and the number of people in front of the ATM. The rules may also be codified to perform certain actions if someone is detected sleeping in the ATM booth, or if a suspicious individual enters the ATM booth.

Other embodiments of the present invention may be used in a community security system, which could be used in neighborhoods, retirement villages, residential communities, corporate campuses, construction sites, etc. For example, a security application may be created using the components of the present invention for a residential community with commonly shared facilities, such as streets, roads, playgrounds, tennis courts, swimming pools, etc. Digital cameras would be installed in strategic places, e.g., on the streets overlooking the playgrounds. Video data would be gathered and displayed in real-time over a wireless or wired network so that any resident (or security guard) can watch any camera from anywhere at any time. Action components would be used to send an alert if a child is noticed alone in the playground, if unauthorized cars are perusing the street, etc.

In some embodiments, other sensory devices may be added to the community security application by using other input components. For example, radon levels, $CO_2$ levels, fire detectors, smoke detectors, dust particle detectors, etc. may be added by using an appropriate input component. Rules in the rules engine could be customized, for example, if a fire is detected, then alerts may be sent to individuals who are affected as well as to the fire department. Another sample rule that could be implemented in the rules engine would detect a person who has not left their house for a certain period of time and to alert appropriate relatives. Yet another sample rule would send alerts if power failed in the community.

In other embodiments, water and electric meters having the capability of transmitting data electronically may be used with appropriate input components. An input component may receive data from water meters and the rules engine may monitor water usage and time of day, present water usage versus past water usage, etc. and send alerts for possible leaks, broken pipes, etc. An input component may receive data from electrical meters and the rules engine may monitor electric usage and time of day, present electric usage versus past electric usage, etc. and send alerts for possible broken wires, electrical shorts, etc.

More advanced applications may be created using storage of historical data. For example, a database may be created of past intruders or fraudulent perpetrators. Their faces may be recorded in the database. Future incidences may be prevented by matching suspicious individuals against the database.

In one embodiment, the rules may be set by a system administrator. In another embodiment, the rules may be heuristically updated. For example, the rules may be learned based on past occurrences. In one embodiment, a learning component may be added which can recognize missing rules. If an alert was not issued when it should have been, this may be noted by an administrator of the system, and a new rule may be automatically generated.

In some embodiments of the present invention, encryption is provided for added privacy. For example, a user may restrict who on the internet may watch the surveillance cameras and have access to the data. Access may also be restricted by time, location, and camera. Stored historical data may also be encrypted for privacy.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to embodiments thereof, it will be understood by those skilled in the art that various other changes in the form and details may be made without departing from the spirit and scope of the invention.

What is claimed is:

1. A system for monitoring, alerting, and acting, comprising:
   one or more sensory devices for performing a measurement and generating input data;
   one or more video sources for capturing video data;
   one or more storage areas for storing video data and input data;
   one or more processors, operatively coupled to the one or more storage areas; and
   one or more memories, operatively coupled to the one or more processors and the one or more storage areas, the one or more memories storing program code to:
      receive input data from the one or more sensory devices;
      determine one or more data weights for the input data based at least on three weights including a weight corresponding to a reliability of the source of the input data, a weight corresponding to a time the input data was received, and a weight corresponding to a frequency that the input data was received;
      receive video data from the one or more video sources;
      perform image analysis on the video data to generate one or more video parameters;
      determine one or more video weights for the video parameters based at least on a weight corresponding to a source of video data used to calculate the video parameters;
      evaluate a set of rules based on the input data, the video parameters, the data weights, and the video weights; and
      perform one or more actions based on the evaluation of the set of rules.

2. The system of claim 1, wherein future data weights are determined from past data weights using additional external event weights corresponding to external events, and
   wherein the events external to the system include at least an event selected from the group consisting of police databases, and anonymous tips.

3. The system of claim 1, further comprising program code to:
   generate meta-data based on the input data and the video parameters.

4. The system of claim 1, further comprising program code to:
   receive data from external police databases; and
   evaluate the set of rules based on the received data.

5. The system of claim 1, further comprising program code to:
   receive data from anonymous tips, the anonymous tips having unidentified source, unidentified location, and unidentified timestamp; and
   evaluate the set of rules based on the received data.

6. The system of claim 1, wherein the set of rules includes at least a rule for activating an action when a weighted sum of a set of events is greater than a predetermined threshold.

7. The system of claim 1, wherein the video parameters are determined from the video data by a weighted integral of the video data over time, weighted by a video weighing function.

8. The system of claim 7, wherein the video parameters are determined from the video data by a predefined function of the weighted integral, and the predefined function is a composition of several other functions.

9. The system of claim 1, further comprising:
   one or more audio sources for capturing audio data,
   wherein the one or more memories further comprise program code to:
      receive audio data from the one or more audio sources;
      perform audio analysis on the audio data to generate one or more audio parameters; and
      determine one or more audio weights for the audio parameters based at least on a weight corresponding to a source of the audio data used to generate the audio parameters.

10. The system of claim 1, further comprising program code to:
    receive historical video data from the one or more storage areas;
    determine one or more historical video data weights for the historical video data; and
    evaluate the set of rules based at least on the historical video data and the historical video data weights.

11. A system for monitoring, alerting, and acting, comprising:
    one or more sensory devices for performing a measurement and generating input data;
    one or more storage areas for storing input data;

one or more processors, operatively coupled to the one or more storage areas; and
one or more memories, operatively coupled to the one or more processors and the one or more storage areas, the one or more memories storing program code to:
receive input data from the one or more sensory devices;
determine one or more data weights for the input data based at least on three weights including a weight corresponding to a source of the input data, a weight corresponding to a time the input data was received, and a weight corresponding to a frequency that the input data was received;
evaluate a set of rules based on the input data and the data weights; and
perform one or more actions based on the evaluation of the set of rules.

12. The system of claim 11, wherein future data weights are determined from past data weights using additional external event weights, and
wherein the events external to the system include at least an event selected from the group consisting of police databases, and anonymous tips.

13. The system of claim 11, further comprising program code to:
receive input from external police databases; and
evaluate the set of rules based on the received input.

14. The system of claim 11, further comprising program code to:
receive input from anonymous tips, the anonymous tips having unidentified source, unidentified location, and unidentified timestamp; and
evaluate the set of rules based on the received input.

15. The system of claim 11, wherein the set of rules includes at least a rule for activating an action when a weighted sum of a set of events is greater than a predetermined threshold.

16. The system of claim 11, wherein the video parameters are determined from the video data by a weighted integral of the video data over time, weighted by a video weighing function.

17. The system of claim 11, wherein the video parameters are determined from the video data by a predefined function of the weighted integral, and the predefined function is a composition of several other functions.

18. The system of claim 11, further comprising:
one or more audio sources for capturing audio data;
wherein the one or more memories further comprise program code to:
receive audio data from the one or more audio sources;
perform audio analysis on the audio data to generate one or more audio parameters; and
determine one or more audio weights for the audio parameters based from a weight corresponding to a source of the audio data used to generate the audio parameters.

19. The system of claim 11, further comprising program code to:
receive historical data from the one or more storage areas;
determine one or more historical data weights for the historical data; and
evaluate the set of rules based at least on the historical data and the historical data weights.

20. The system of claim 11, further comprising program code to:
perform data analysis on the input data to generate one or more data parameters; and
determine one or more data parameter weights for the data parameters based at least on a weight corresponding to a source of the input data, a weight corresponding to a time the input data was received, and a weight corresponding to a frequency that the input data was received.

21. A method for monitoring, alerting, and acting, comprising the following steps:
receiving input data from one or more sensory devices;
determining via a computer processor one or more data weights for the input data based at least on three weights including a weight corresponding to a source of the input data, a weight corresponding to a time the input data was received, and a weight corresponding to a frequency that the input data was received;
evaluating a set of rules based on the input data and the data weights; and
performing one or more actions based on the evaluation of the set of rules.

22. The method of claim 21, wherein future data weights are determined from past data weights using additional external event weights, and
wherein the events external to the system include at least an event selected from the group consisting of police databases, and anonymous tips.

23. The method of claim 21, further comprising:
receiving input from external police databases; and
evaluating the set of rules based on the received input.

24. The method of claim 21, further comprising:
receiving input from anonymous tips, the anonymous tips having unidentified source, unidentified location, and unidentified timestamp; and
evaluating the set of rules based on the received input.

25. The method of claim 21, wherein the set of rules includes at least a rule for activating an action when a weighted sum of a set of events is greater than a predetermined threshold.

26. The method of claim 21, wherein the video parameters are determined from the video data by a weighted integral of the video data over time, weighted by a video weighing function.

27. The method of claim 21, wherein the video parameters are determined from the video data by a predefined function of the weighted integral, and the predefined function is a composition of several other functions.

28. The method of claim 21, further comprising:
receiving audio data from the one or more audio sources;
performing audio analysis on the audio data to generate one or more audio parameters; and
determining one or more audio weights for the audio parameters based from a weight corresponding to a source of the audio data used to generate the audio parameters.

29. The method of claim 21, further comprising:
receiving historical data from the one or more storage areas;
determining one or more historical data weights for the historical video data; and
evaluating the set of rules based at least on the historical data and the historical data weights.

30. The method of claim 21, further comprising:
performing data analysis on the input data to generate one or more data parameters; and
determining one or more data parameter weights for the data parameters based at least on a weight corresponding to a source of the input data, a weight corresponding to a time the input data was received, and a weight corresponding to a frequency that the input data was received.

31. An apparatus for monitoring, alerting, and acting, comprising:
- one or more input components adapted to receive input data from one or more data sources;
- one or more storage areas for storing the input data;
- a data weight component adapted to determine one or more data weights for the input data based at least on three weights including a weight corresponding to a source of the input data, a weight corresponding to a time the input data was received, and a weight corresponding to a frequency that the input data was received;
- a rules engine adapted to evaluate a set of rules based on the input data and the data weights; and
- one or more action components adapted to perform one or more actions based on the evaluation of the set of rules.

32. The apparatus of claim 31, wherein future data weights are determined from past data weights using additional external event weights, and
- wherein the events external to the system include at least an event selected from the group consisting of police databases, and anonymous tips.

33. The apparatus of claim 31, further comprising:
- an external data source component adapted to receive input from external police databases,
- wherein the rules engine evaluates the set of rules based on the received input.

34. The apparatus of claim 31, further comprising:
- an external data source component adapted to receive input from anonymous tips, the anonymous tips having unidentified source, unidentified location, and unidentified timestamp,
- wherein the rules engine evaluates the set of rules based at least on the received input.

35. The apparatus of claim 31, wherein the set of rules includes at least a rule for activating an action when a weighted sum of a set of events is greater than a predetermined threshold.

36. The apparatus of claim 31, wherein the weights are determined at least on a weight corresponding to a source of the input data, a weight corresponding to a time the input data was received, and a weight corresponding to a frequency that the input data was received.

37. The apparatus of claim 31, wherein the video parameters are determined from the video data by a weighted integral of the video data over time, weighted by a video weighing function.

38. The apparatus of claim 37, wherein the video parameters are determined from the video data by a predefined function of the weighted integral, and the predefined function is a composition of several other functions.

39. The apparatus of claim 31, further comprising:
- one or more video inputs adapted to receive video data from one or more video sources;
- one or more video detection components adapted to perform video analysis on the video data to generate one or more video parameters; and
- one or more video weight components adapted to generate one or more video parameter weights based at least on a weight corresponding to a source of the video data used to generate the video parameters.

40. The apparatus of claim 31, further comprising:
- one or more data analysis components adapted to perform data analysis on the input data to generate one or more data parameters; and
- one or more data parameter weight components adapted to generate one or more data parameter weights based at least on a weight corresponding to a source of the input data, a weight corresponding to a time the input data was received, and a weight corresponding to a frequency that the input data was received,
- wherein the rules engine evaluates the set of rules based at least on the data parameters and the data parameter weights.

* * * * *